United States Patent
Yu et al.

(10) Patent No.: US 8,464,294 B2
(45) Date of Patent: Jun. 11, 2013

(54) METHOD, TERMINAL AND SYSTEM FOR PLAYING PROGRAMS

(75) Inventors: Dawei Yu, Beijing (CN); Zhikun Guo, Beijing (CN); Yaosheng Lin, Beijing (CN); Yu Tan, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 196 days.

(21) Appl. No.: 13/052,915

(22) Filed: Mar. 21, 2011

(65) Prior Publication Data

US 2011/0173666 A1    Jul. 14, 2011

Related U.S. Application Data

(63) Continuation of application No. PCT/CN2009/074108, filed on Sep. 22, 2009.

(30) Foreign Application Priority Data

Sep. 23, 2008  (CN) .......................... 2008 1 0211356

(51) Int. Cl.
- *G06F 3/00* (2006.01)
- *G06F 13/00* (2006.01)
- *H04N 5/445* (2011.01)

(52) U.S. Cl.
USPC ................................. 725/47; 725/46; 725/53

(58) Field of Classification Search
None
See application file for complete search history.

(56) References Cited

U.S. PATENT DOCUMENTS

| | | |
|---|---|---|
| 6,981,040 B1 | 12/2005 | Konig et al. |
| 7,082,613 B1 | 7/2006 | Mineyama |
| 2003/0084447 A1 | 5/2003 | Lee |
| 2007/0074245 A1* | 3/2007 | Nyako et al. .................... 725/34 |
| 2007/0118873 A1* | 5/2007 | Houh et al. .................... 725/136 |
| 2008/0126092 A1 | 5/2008 | Kawazoe et al. |
| 2008/0256578 A1* | 10/2008 | Narahara et al. ................ 725/45 |

FOREIGN PATENT DOCUMENTS

| | | |
|---|---|---|
| CN | 1416266 A | 5/2003 |
| CN | 1901639 A | 1/2007 |
| CN | 101132496 A | 2/2008 |

(Continued)

OTHER PUBLICATIONS

International Search Report issued in corresponding PCT Patent Application No. PCT/CN2009/074108, mailed Dec. 31, 2009.

Written Opinion of the International Searching Authority issued in corresponding PCT Patent Application No. PCT/CN2009/074108, mailed Dec. 31, 2009.

(Continued)

*Primary Examiner* — Nnenna Ekpo
(74) *Attorney, Agent, or Firm* — Brinks Hofer Gilson & Lione

(57) ABSTRACT

A method, terminal, and system for playing programs are disclosed. The method includes: creating virtual channels corresponding to keywords in a keyword list according to the keywords, and using the virtual channels to form a virtual channel list; identifying programs inclusive of the keywords among received programs; using the programs inclusive of the keywords to generate a playlist of the virtual channels corresponding to the keywords according to a preset playlist generation rule; and playing the programs in the playlist. Through the present disclosure, the same type of BTV programs that match a keyword on different channels are scheduled together, the required operations of pressing keys are reduced, and the user experience is improved.

21 Claims, 7 Drawing Sheets

FOREIGN PATENT DOCUMENTS

| | | |
|---|---|---|
| CN | 101355664 A | 1/2009 |
| EP | 1848215 A2 | 10/2007 |
| JP | 2000341596 A | 12/2000 |
| JP | 2002125168 A | 4/2002 |
| WO | WO 0139494 A1 | 5/2001 |
| WO | WO 2007108598 A1 | 9/2007 |
| WO | WO 2010037331 A1 | 4/2010 |

OTHER PUBLICATIONS

Extended European Search Report issued in corresponding European Patent Application No. 09817245.5, mailed Feb. 1, 2012.

Office Action issued in corresponding Chinese Patent Application No. 200810211356.4, mailed Aug. 21, 2009.

\* cited by examiner

# METHOD, TERMINAL AND SYSTEM FOR PLAYING PROGRAMS

CROSS-REFERENCE TO RELATED APPLICATIONS

This application is a continuation of International Application No. PCT/CN2009/074108, filed on Sep. 22, 2009, which claims priority to Chinese Patent Application No. 200810211356.4, filed on Sep. 23, 2008, both of which are hereby incorporated by reference in their entireties.

FIELD OF THE DISCLOSURE

The present disclosure relates to communication technologies, and in particular, to a method, terminal, and system for playing programs.

BACKGROUND

An Electronic Program Guide (EPG) is delivered by a front-end system and presented to a user through a terminal. It includes Broadcast Television (BTV) programs in all channels. The user can browse all BTV programs on the terminal, and select favorite BTV programs.

BTV is also known as live broadcast television. Currently, it is one of the main services of a Set Top Box (STB). A significant feature of the BTV service is that the start time and the end time of each BTV program are relatively fixed, and will not be advanced or postponed at a user's discretion. The BTV programs will not be rebroadcast at the user's discretion. Therefore, the user tends to miss some BTV programs which should not be missed.

Currently, a user selects favorite BTV programs in the following modes:

Mode 1: Browse the BTV programs in the EPG information, select a favorite BTV program, and press the OK key to access the channel of the BTV program and watch the program.

Mode 2: From any channel, press the channel switching key (the channel up key, or the channel down key) continuously to select a favorite BTV program.

Mode 3: Memorize the channel number corresponding to a favorite BTV program, and press the number key corresponding to the channel number to switch to this channel.

Mode 4: See information provided by the STB which prompts the user to decide whether to watch a reserved favorite BTV program upon arrival of the time of playing the reserved BTV program, and press the OK key to watch the program.

In the process of implementing the present disclosure, the inventor finds at least the following problems in the prior art:

In the prior art, when the user wants to switch between programs or reserve a program, the user needs to perform plenty of operations, or browse and memorize plenty of program information, which deteriorates the user experience.

SUMMARY

The embodiments of the present disclosure provide a method, terminal, and system for playing programs. The method schedules together the same type of BTV programs that match a keyword, reduces the required operations of pressing keys and information that needs to be memorized by the user, and improves the user experience.

To fulfill the foregoing objectives, a method for playing programs is provided in an embodiment of the present disclosure. The method includes: creating virtual channels corresponding to keywords in a keyword list according to the keywords, and using the virtual channels to form a virtual channel list; identifying programs inclusive of the keywords among received programs; generating a playlist of the virtual channels corresponding to the keywords using the identified programs and a preset playlist generation rule; and playing the programs in the playlist.

Further, a method for playing programs in an embodiment of the present disclosure includes: retrieving keywords of each program according to a program type, and generating a keyword list according to the keywords; retrieving the keywords in the keyword list to generate an EPG of the programs, and adding a corresponding keyword to each program in the EPG according to the retrieved keywords; and sending the keyword list and the EPG to a terminal so that the terminal can select the programs that match the keywords according to the keyword list and the EPG, generate a playlist of corresponding virtual channels, and play the programs in the playlist.

A terminal for playing programs in an embodiment of the present disclosure includes: a channel list creating module, configured to create virtual channels corresponding to keywords in a keyword list according to the keywords, and use the virtual channels to form a virtual channel list; an identifying module, configured to identify programs inclusive of the keywords among received programs according to activated keywords when the keywords in the keyword list are activated; a playlist generating module, configured to generate a playlist of the virtual channels corresponding to the keywords using the identified programs and a preset playlist generation rule, where the virtual channels are included in the virtual channel list created by the channel list creating module; and an activating module, configured to activate the virtual channels, and play the programs in the playlist generated by the playlist generating module.

Further, a server provided in an embodiment of the present disclosure includes: a keyword list generating module, configured to retrieve keywords according to a program type, and generate a keyword list according to the keywords; an EPG generating module, configured to retrieve the keywords in the keyword list to generate an EPG, and add a corresponding keyword to each program in the EPG according to the keywords retrieved by the keyword list generating module; and a sending module, configured to send the keyword list generated by the keyword list generating module and/or the EPG generated by the EPG generating module.

Further, a system for playing programs in an embodiment of the present disclosure includes: a server, configured to: deliver programs to a terminal, and send an EPG; and the terminal, configured to: identify the programs inclusive of activated keywords among the programs delivered by the server, generate a playlist of virtual channels corresponding to the keywords, and play the programs in the playlist corresponding to the virtual channels after the virtual channels are activated.

The present disclosure brings at least the following benefits: Through the method, apparatus, and system disclosed herein, a playlist of virtual channels is generated according to keywords, and the programs in the playlist are played; and the same type of BTV programs that match a keyword on different logical channels can be scheduled together. Therefore, the required operations of pressing keys are reduced, and the user experience is improved.

BRIEF DESCRIPTION OF THE DRAWINGS

The drawings outlined below are intended to enable a thorough understanding of the present disclosure. They are part of this application, but shall not be construed as a limitation to the present disclosure.

DETAILED DESCRIPTION OF THE EMBODIMENTS

The embodiments of the present disclosure provide a method, terminal, and system for playing programs. The method schedules together the same type of BTV programs that match a keyword on different logical channels, and reduces the required operations of pressing keys.

The present disclosure is hereinafter described in detail with reference to embodiments and accompanying drawings. Evidently, the embodiments herein are merely representative of particular embodiments of the present disclosure, and shall be regarded as illustrative in nature and not exhaustive or restrictive. All other embodiments, which can be derived by those skilled in the art from the embodiments given herein without any creative efforts, fall within the scope of the present disclosure.

Figure 1:
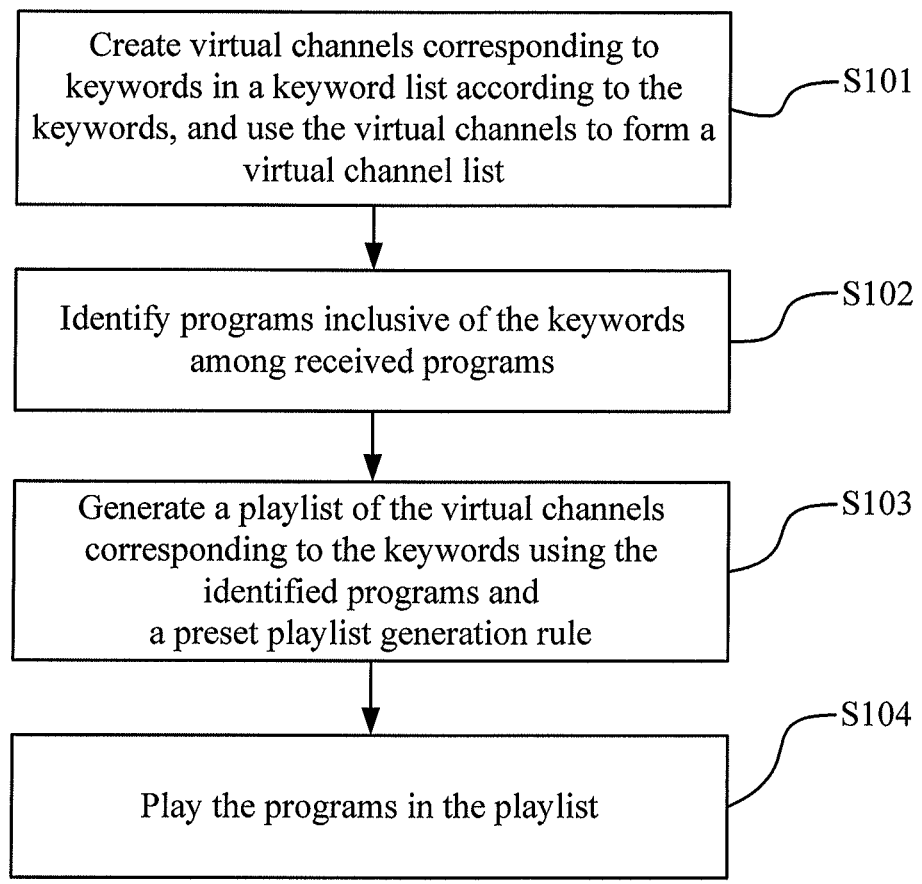
FIG. 1 is a flowchart of a method for playing programs in a first embodiment of the present disclosure.

FIG. 1 is a flowchart of a method for playing programs in the first embodiment of the present disclosure. This embodiment is described from the perspective of the terminal, which can play program. The method includes the following steps:

Step S101: Create virtual channels corresponding to keywords in a keyword list according to the keywords, and use the virtual channels to form a virtual channel list.

In practice, the keyword list may be obtained in the following modes:

Mode 1: The user receives a keyword list sent by the server, namely, receives a keyword list generated by the server according to the keywords retrieved from the content or subject of a program.

The user can update the keyword list by keeping receiving the keyword list sent by the server, and the user can select, activate or deactivate the keyword list, but cannot edit or modify the content of the keywords in the list.

The keyword list obtained in this mode may be stored in a memory or a nonvolatile memory. The type of the nonvolatile memory shall not be construed as a limitation to the present disclosure.

Mode 2: The user presets a keyword list, namely, edits and generates a custom keyword list as required.

The generated keyword list is stored in the nonvolatile memory, and the user adds new keywords to the keyword list according to the application requirements, or edits or deletes an existing keyword. Likewise, the user can select, activate or deactivate the keyword list. The type of the nonvolatile memory shall not be construed as a limitation to the present disclosure.

Mode 3: The server delivers a default keyword list to the user, and the user maintains the list as required. The maintenance includes adding, deleting and modifying keywords.

It should be noted that the keywords mentioned herein include not only program names, but also information about actors/actresses, directors, producers, and program types, or any combination thereof. For example, a keyword takes the form of "name+type".

Based on the description about the mode of obtaining the keyword list above, creating the virtual channels corresponding to the keywords in the keyword list according to the keywords, and using the virtual channels to form a virtual channel list is:

mapping a keyword in the keyword list to one or more virtual channels in the virtual channel list, and mapping each virtual channel to an independent logical channel, where the logical channel mentioned here is the TV channel from which the user watches the BTV program, and corresponds to an actually allocated band, but this band may be currently not in use.

The virtual channel refers to a channel where BTV programs of different logical channels are scheduled together according to specific rules in the order of start time of the programs, and can be played in one or more independent logical channels. The specific rules include: order of the start time of the programs, order of the end time of the programs, total duration of the programs, and extent of matching between the programs and the program selection rules of this virtual channel.

It should be noted that after the corresponding virtual channel list is created according to the keyword list, the procedure further includes:

detecting whether any keyword in the keyword list changes; and, if so, updating the virtual channel list according to the change of the keyword in the keyword list.

Specifically, corresponding to the three modes of obtaining the keyword list, the detection of the change of the keyword in the keyword list also comes in three scenarios:

Scenario 1: If the user obtains the keyword list by receiving the keyword list sent by the server, the change of the keyword refers to addition or deletion of the keyword, and the change is initiated by the server, or implemented by receiving a new keyword from the server.

Scenario 2: If the user presets a keyword list, the change of the keyword refers to addition, modification or deletion of the keyword, and the change is initiated by the user.

Scenario 3: If the keyword list is predefined by the server and maintained by the user, the change of the keyword refers to addition, modification or deletion of the keyword, and the change is initiated by the user.

Corresponding to the scenarios of the change of the keyword, the update of the virtual channel list comes in the following scenarios:

When a keyword is deleted from the keyword list, the activated virtual channel corresponding to the deleted keyword in the virtual channel list is deactivated, and the mapping relation between the deleted keyword and the virtual channel is cancelled.

When a keyword is modified in the keyword list, the mapping relation between the old keyword and the virtual channel is replaced with the mapping relation between the new keyword and the virtual channel.

It should be noted that this scenario occurs only if the keyword list is preset by the user, namely, the user can modify the keyword list and change the old keyword content to the new keyword content. In this case, the mapping relation between the old keyword and the virtual channel is replaced with the mapping relation between the new keyword and the virtual channel, thus reducing the system load caused by reallocation of the virtual channel.

At the time of adding a new keyword to the keyword list, a mapping relation is created between the new keyword and the virtual channel. The virtual channel mentioned here may be the old virtual channel or a new virtual channel which is added for this new keyword. If the new keyword is added by the server, the mapping relation between the new keyword and the virtual channel is also created by the server; if the new keyword is added by the user, the user reports the new keyword to the server, and the server creates the mapping relation between the new keyword and the virtual channel.

Step S102: Identify programs inclusive of the keywords among received programs.

Specifically, identifying programs inclusive of the keywords among received programs refers to: identifying the programs inclusive of the keywords according to activated keywords when the keywords in the keyword list are activated.

The activation of the keywords in the keyword list includes the following two processes:

1. Display the keywords in the keyword list and the current state of each keyword.

The specific display modes include:

displaying the keywords in the keyword list; and using different colors, transparencies, fonts, or sizes of words to indicate whether the current states of the corresponding keywords are active or inactive.

2. Receive a message for activating or deactivating one or more keywords in the keyword list.

Before receiving a message for activating or deactivating one or more keywords in the keyword list, the procedure further includes:

receiving a message for selecting one or more keywords in the keyword list.

If the current state of one or more keywords indicated in the message for selecting keywords is active, the message for activating or deactivating keywords indicates whether to deactivate the keywords; if the current state of one or more keywords indicated in the message for selecting keywords is inactive, the message for activating or deactivating keywords indicates whether to activate the keywords.

After the keywords in the keyword list are displayed, the user may select one or more keywords according to the display results, and send a message for selecting the keywords. The message for selecting the keywords may be generated through operations on a remote control or through control keys on the device. If the device provides or is connected to a touch control apparatus, the user can select the keywords through the touch control apparatus. The difference of the operation mode shall not be construed as a limitation to the present disclosure.

It should be noted that the receiving of programs mentioned in this process comes in the following two scenarios:

Scenario 1: The server sends a program that includes a keyword field. The keyword field includes a keyword which is preset by the server and corresponds to the program.

In this case, the program provider or the server needs to add the keyword field when providing the program, retrieve one or more keywords of the program beforehand according to the content and subject of the program, and store the keyword into the added keyword field.

In this case, the activated keyword in the keyword list can be matched with the keyword in the keyword field of the program directly. If the keyword field includes the activated keyword, it is determined that the program falls within the range indicated by the activated keyword, namely, the program is regarded as inclusive of the activated keyword.

Scenario 2: The server sends a program that includes a program name.

In this case, the program provider or the server does not need to modify the program or add a field directly, but needs only to add the program name to the delivered program.

The activated keyword in the keyword list is matched with the program name of the program. If the program name includes the entirety of the keyword, it is determined that the program falls within the range indicated by the activated keyword, namely, the program is regarded as inclusive of the activated keyword.

Step S103: Generate a playlist of the virtual channels corresponding to the keywords using the identified programs and a preset playlist generation rule.

Specifically, according to the identification result in process S102, the identified programs that include the activated keywords are arranged according to the preset playlist generation rule, and a playlist of the virtual channels corresponding to the activated keywords is generated. Likewise, there may be one or more generated playlists, which correspond to different virtual channels.

Step S104. Play the programs in the playlist.

Specifically, a corresponding virtual channel is activated to trigger the playing of the programs in the playlist.

Further, after activating the virtual channel and playing the programs in the playlist, the procedure comes in the following scenarios:

Scenario 1: playing the programs that share the same time segment.

In playing the first program in the playlist, when the start time of the second program in the playlist arrives, the terminal prompts the user to decide whether to switch the first program to the second program.

When receiving a message for switching the first program to the second program, the terminal switches the first program to the second program.

When receiving a message for rejecting the switching from the first program to the second program, the terminal goes on playing the first program, and switches to the second program upon completion of the first program.

Scenario 2: switching the currently played virtual channel.

If multiple virtual channels are activated, the terminal switches between multiple activated virtual channels according to the received virtual channel switching message.

It should be noted that in step S101 to step S104, the operation message may be generated through operations on a remote control or through control keys on the device. If the device provides or is connected to a touch control apparatus, the foregoing operations can be performed through the touch control apparatus. The difference of the operation mode shall not be construed as a limitation to the present disclosure.

The embodiment brings at least the following benefits: A playlist of virtual channels is generated according to keywords, and the programs in the playlist are played; and the same type of BTV programs that match a keyword on different logical channels are scheduled together. Therefore, the required operations of pressing keys are reduced, and the user experience is improved.

Figure 2:
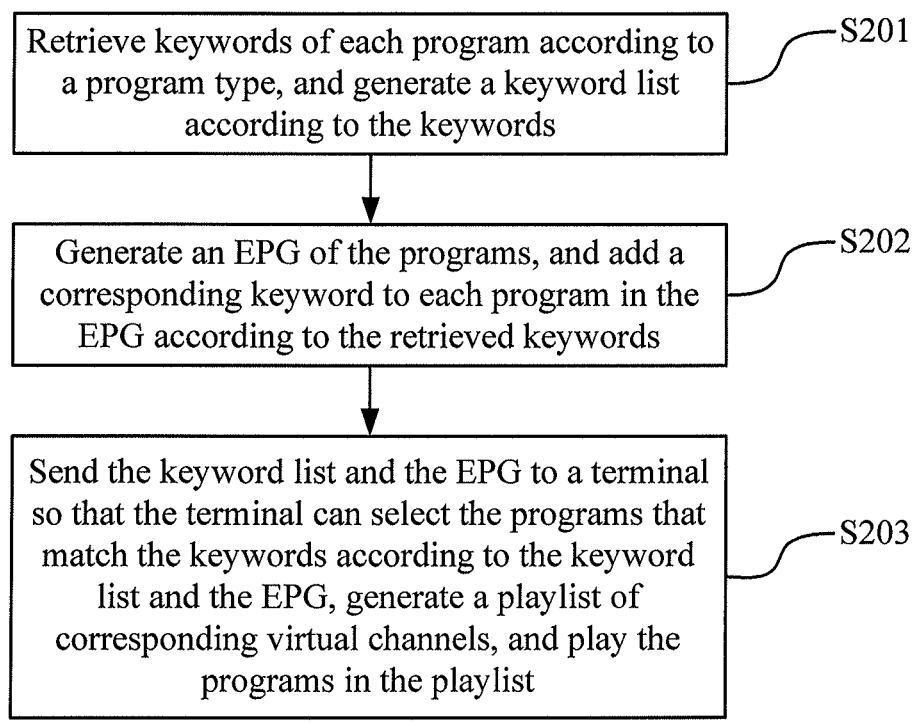
FIG. 2 is a flowchart of a method for playing programs in a second embodiment of the present disclosure.

FIG. 2 is a flowchart of a method for playing programs in the second embodiment of the present disclosure. This embodiment is described from the perspective of the server. The method includes the following processes:

Step S201: Retrieve keywords of each program according to a program type, and generate a keyword list according to the keywords.

The content provider or operator retrieves the keywords of each program according to the type and subject of the program, and generates a keyword list.

Step S202: Retrieve the keywords in the keyword list to generate an EPG of the programs, and add a corresponding keyword to each program in the EPG according to the retrieved keywords.

A keyword field is added to every BTV EPG. The content of this field is the keyword of the corresponding program.

In this embodiment, one BTV program may have multiple keywords, and the keywords are separated by commas or other symbols.

Step S203: Send the keyword list and the EPG to a terminal so that the terminal can select the programs that match the keywords according to the keyword list and the EPG, generate a playlist of corresponding virtual channels according to the selected programs, and play the programs in the playlist.

A keyword list and a BTV EPG are delivered to each user, and a large-capacity independent logical channel is provided for the virtual channel service.

If the keyword list is preset by the terminal, this process may further include: sending the programs inclusive of the program names so that the terminal can select the programs that match the keywords according to the program names, generate a playlist of corresponding virtual channels according to the selected programs, and play the programs in the playlist.

Further, after sending the keyword list and the EPG to the terminal, the procedure further includes:

generating a new keyword list according to changes of programs; and sending a message for updating the keyword list to the terminal according to the new keyword list, or sending the updated keyword list to the terminal.

The embodiment brings at least the following benefits: The same type of BTV programs that match a keyword on different logical channels are scheduled together, the required operations of pressing keys are reduced, and the user experience is improved.

Figure 3:
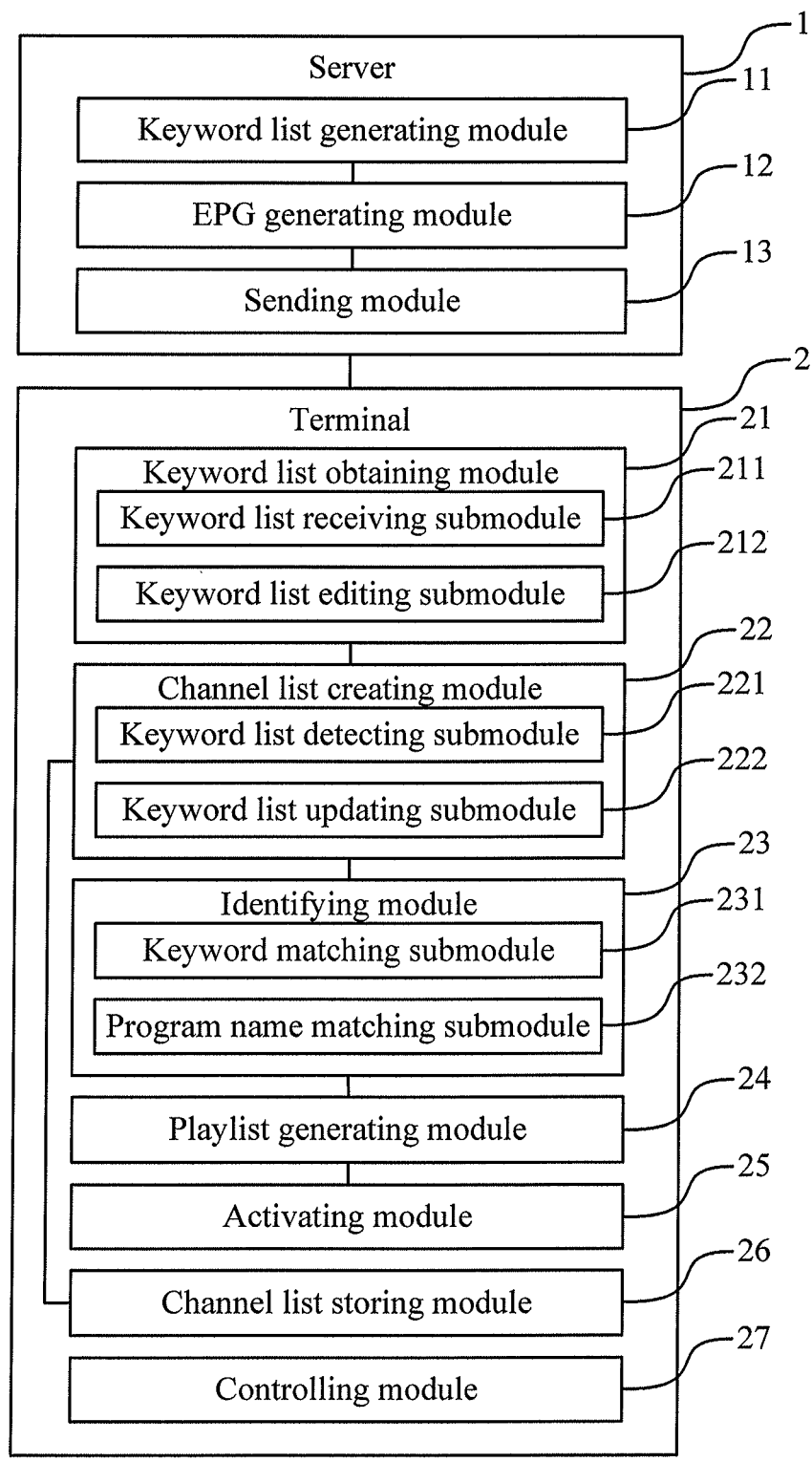
FIG. 3 shows a structure of a system for playing programs in a third embodiment of the present disclosure.

Based on the foregoing method for implementing virtual channels, a system for playing programs is provided in an embodiment of the present disclosure. FIG. 3 shows a structure of a system for playing programs in the third embodiment of the present disclosure. The system includes a server and a terminal.

The server 1 is configured to: deliver programs to the terminal 2, send an EPG, retrieve the keywords of programs according to the subjects of the programs, and generate a keyword list.

The server 1 includes:

a keyword list generating module 11, configured to retrieve keywords according to a program type, and generate a keyword list according to the keywords;

an EPG generating module 12, configured to retrieve the keywords in the keyword list to generate an EPG, and add a corresponding keyword to each program in the EPG according to the keywords retrieved by the keyword list generating module; and a sending module 13, configured to send the keyword list generated by the keyword list generating module and/or the EPG generated by the EPG generating module, and send the programs inclusive of the program names.

The terminal 2 is configured to: identify the programs inclusive of activated keywords among the programs delivered by the server 1, generate a playlist of virtual channels corresponding to the keywords, and play the programs in the playlist corresponding to the virtual channels after the virtual channels are activated.

In the specific application environment, the terminal can receive the generated keyword list sent by the server, and receive the operation message from the user to edit and generate a keyword list. The terminal includes: a keyword list obtaining module 21, a channel list creating module 22, an identifying module 23, a playlist generating module 24, and an activating module 25.

The keyword list obtaining module 21 is configured to obtain a keyword list.

Specifically, the keyword list obtaining module 21 further includes one or more of the following modules:

a keyword list receiving submodule 211, configured to receive the keyword list sent by the server, and deployed in the scenario where the server sends the keyword list in the first embodiment above; and a keyword list editing submodule 212, configured to receive the operation message from the user and edit the keyword list, and deployed in the scenario where the user presets the keyword list in the first embodiment above.

It should be noted that in a practical application, the keyword list obtaining module 21 may include both of the submodules above, or, depending on the mode of providing the keyword list, include only one corresponding submodule described above. Such variations shall not be construed as a limitation to the present disclosure.

The channel list creating module 22 is configured to create virtual channels corresponding to keywords in the keyword list obtained by the keyword list obtaining module 21, and use the virtual channels to form a virtual channel list.

The channel list creating module 22 includes:

a keyword list detecting submodule 221, configured to detect whether any keyword in the keyword list has changed; and a keyword list updating submodule 222, configured to update the virtual channel list according to the change of the keyword in the keyword list if the keyword list detecting submodule 221 detects that a keyword in the keyword list has changed.

The identifying module 23 is configured to identify programs inclusive of the keywords among received programs according to activated keywords when the keywords in the keyword list obtained by the keyword list obtaining module 21 are activated.

The identifying module 23 includes:

a keyword matching submodule 231, configured to match the activated keywords with the information in the keyword field if the program includes the keyword field, and identify the program inclusive of the activated keywords, and deployed in the scenario where the server sends the program inclusive of a keyword field in the first embodiment above; and a program matching submodule 232, configured to match the activated keywords with the information in the program name of the program if the program includes no keyword field, and identify the program inclusive of the activated keywords, and deployed in the scenario where the server sends the program inclusive of the program name in the first embodiment above.

It should be noted that in a practical application, the identifying module 23 may include both of the submodules above, or, depending on the type of the delivered program, include only one corresponding submodule described above. Such variations shall not be construed as a limitation to the present disclosure.

The playlist generating module 24 is configured to use the programs inclusive of the keywords identified by the identifying module 23 to generate a playlist of the virtual channels corresponding to the keywords according to a preset playlist generation rule, where the virtual channels are included in the virtual channel list created by the channel list creating module 22.

The activating module 25 is configured to activate the virtual channels, and play the programs in the playlist generated by the playlist generating module 24.

In practice, the terminal above is an STB and may further include:
- a channel list storing module 26, configured to store the virtual channel list created by the channel list creating module; and/or
- a controlling module 27, configured to operate a virtual channel in the virtual channel list created by the channel list creating module, or the playlist generated by the playlist generating module.

Specifically, the controlling module 27 may be an external remote control attached to the STB, or control keys on the STB, or a touch control module located in or externally connected to the STB. The variations of the controlling module 27 shall not be construed as a limitation to the present disclosure.

It should be noted that in a practical application, the STB may include both the channel list storing module 26 and the controlling module 27, or, depending on the actual requirements, include only either of them. Such variations shall not be construed as a limitation to the present disclosure.

The foregoing modules may be distributed on one apparatus or multiple apparatuses. The foregoing modules may be combined into one module, or split into multiple submodules.

The embodiment brings at least the following benefits: A playlist of virtual channels is generated according to keywords, and the programs in the playlist are played; and the same type of BTV programs that match a keyword on the same logical channel or different logical channels are scheduled together. Therefore, the required operations of pressing keys are reduced, and the user experience is improved.

To describe the present disclosure more comprehensively, the following embodiments deal with the scenario where the server provides a keyword list and sends a program inclusive of a keyword field, and the scenario where the user presets a keyword list and the server sends a program inclusive of the program name, respectively.

Figure 4:
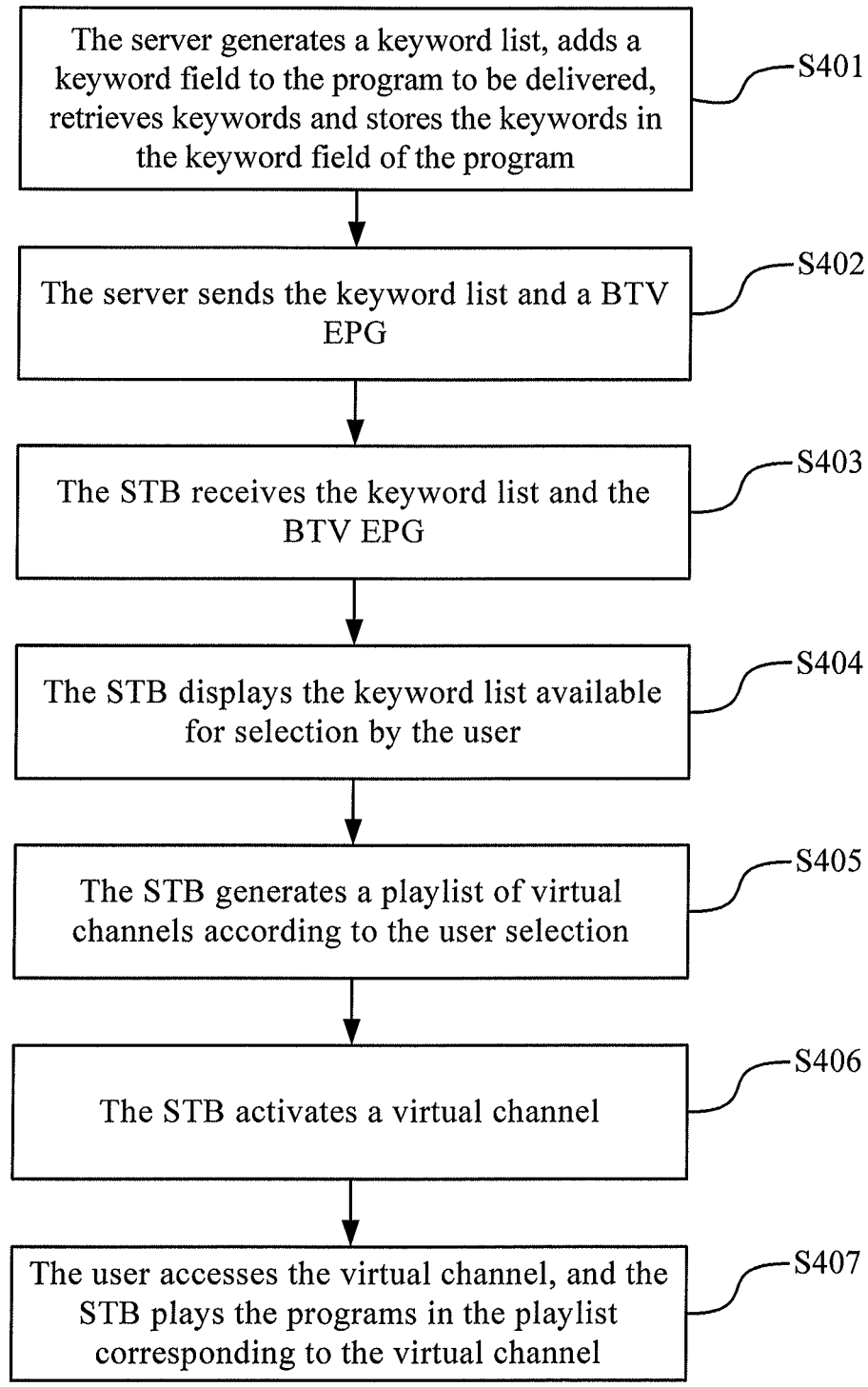
FIG. 4 is a flowchart of a method for playing programs in a fourth embodiment of the present disclosure.

FIG. 4 is a flowchart of a method for playing programs in the fourth embodiment of the present disclosure. In this embodiment, the server provides a keyword list and sends a program inclusive of a keyword field. The method includes the following processes:

Step S401: The server generates a keyword list, adds a keyword field to the program to be delivered, retrieves keywords and stores the keywords in the keyword field of the program.

The server, namely, the content provider or operator, retrieves the keywords of each program according to the type and subject of the program, and generates a keyword list.

Meanwhile, a keyword field is added to every BTV EPG. The content of this field is the keyword of the corresponding program.

In this embodiment, one BTV program may have multiple keywords, and the keywords are separated by commas or other symbols.

Step S402: The server sends the keyword list and a BTV EPG.

The front-end server delivers a keyword list and a BTV EPG to each user, and provides a large-capacity independent logical channel for the virtual channel service. For example, the number segment of the channel is 100-599.

Step S403: The STB receives the keyword list and the BTV EPG.

Specifically, in this embodiment, an STB on the user side implements the service. The type of the terminal shall not be construed as a limitation to the present disclosure.

The STB stores the received keyword list and the BTV EPG into the memory when it is powered on or when it refreshes the EPG.

The keyword list may also be stored in a nonvolatile memory. The difference is as follows:

In the case of power interruption, the keyword list stored in a memory is cleaned up, the user's operation of activating the keyword list is cleaned up, and the keyword list needs to be obtained again at the next power-on.

In the case of power interruption, the keyword list stored in a nonvolatile memory is not cleaned up, and the user's operation of activating the keyword list is reserved, which simplifies the user operation and improves the user experience.

Further, the type of the media for storing the keyword list depends on the preset storage rule, and shall not be construed as a limitation to the present disclosure.

After receiving the keyword list, the STB creates a mapping relation between each keyword and several independent logical channels. For example, the keyword "basketball live" corresponds to over 10 virtual channels, and the number segment of the channels is 100-109; the keyword "football live" corresponds to 10 virtual channels, and the number segment of the channels is 110-119.

Moreover, the STB creates a table of the mapping relations and stores it in a nonvolatile memory, as shown in Table 1.

TABLE 1

Mapping relation between the keyword and the number segment of logical channels

| Keyword | Number Segment of Logical Channels | Virtual Channel Name |
|---|---|---|
| Basketball live | 100-109 | Basketball live 1 - Basketball live 10 |
| Football live | 110-119 | Football live 1 - Football live 10 |
| Movie | 130-139 | Movie 1 - Movie 10 |
| ... | ... | |

The mapping relation list above is a virtual channel list, and includes the fields such as keyword, number segment of logical channels, and virtual channel name.

Further, other fields may be added to the virtual channel list above according to the user requirements or the actual application environment. For example, the programs are further categorized according to the place of live broadcast. Such variations shall not be construed as a limitation to the present disclosure.

After the STB detects that the EPG is refreshed, the STB judges whether the keyword has changed; if so, the STB refreshes the keyword list in time.

If an existing keyword is deleted, the STB refreshes the keyword list, deactivates the active virtual channel related to this keyword, and cancels the mapping relation between this keyword and several logical channels.

In this embodiment, the deletion operation comes in the following two scenarios:

(1) The server initiates an operation of deleting one or more keywords.

(2) The STB receives a new keyword list sent by the server, and updates the old keyword list according to the new keyword list, but the new keyword list does not include one or more keywords in the old keyword list. Therefore, the updating of the old keyword list by using the new keyword list is equivalent to the operation of deleting one or more keywords.

If a new keyword is added, the STB creates a mapping relation between this keyword and several logical channels according to certain policies.

The policies for creating the mapping relation are as follows:

1. Add the new keyword to an existing maximum number segment of channels, and if the maximum number segment of channels is full, select an existing idle number segment of channels; or 2. Select an existing minimum number segment of channels which is idle, and create a new mapping relation between this number segment and the new keyword; or 3. Other policies for creating a mapping relation between the keyword and the logical channels.

The specific policy for creating the mapping relation shall not be construed as a limitation to the present disclosure.

In this embodiment, the procedure for adding a keyword comes in the following two scenarios:

(1) The server initiates an operation of adding one or more keywords.

(2) The STB receives a new keyword list sent by the server, and updates the old keyword list according to the new keyword list, but the new keyword list includes one or more keywords nonexistent in the old keyword list. Therefore, the updating of the old keyword list by using the new keyword list is equivalent to the operation of adding one or more keywords.

Step S404: The STB displays the keyword list available for selection by the user.

A virtual channel service submenu is set on the EPG page. Once the user selects this submenu, all keywords are displayed to the user for selection. In the displayed keywords, the active or inactive state of a keyword is indicated by a specific color or transparency.

If the user selects an inactive keyword, the STB asks the user whether to activate the keyword. After the user confirms activation, the STB generates a playlist of virtual channels automatically according to the keyword, and stores the keyword in a nonvolatile memory. When being powered on next time, the STB activates the keyword automatically.

If the user selects an active keyword, the STB asks the user whether to deactivate the keyword. After the user confirms deactivation, the STB deactivates the virtual channels related to this keyword. The deactivated virtual channel is the same as an inactive virtual channel.

Step S405: The STB generates a playlist of virtual channels according to the user selection.

After the user activates the keyword, the STB searches intraday (00:00:00 to 23:59:59) BTV EPGs of all channels according to the selected keyword to find all BTV programs whose new field content matches this keyword, and use the found BTV programs to form one or more playlists of virtual channels according to certain rules.

Besides, after the STB detects that the EPG is refreshed, the STB judges whether the BTV program information included in the playlist of virtual channels has changed; if so, the STB needs to regenerate the playlist of virtual channels; if not, the STB does not need to regenerate the playlist of virtual channels.

The playlist of virtual channels is made up according to the following rules:

(1) Arrange the programs preliminarily in the order of the start time of each program. Ensure that the ratio of the duration of the previous program to the total duration of the programs reaches a preset threshold before the next program is added, and ensure that the end time of the next program is later than the end time of the previous program.

The preset threshold is decided by the STB manufacturer or the user.

If the threshold is decided by the user, multiple options such as 100%, 90%, and 80% are offered on the setting page for selection by the user.

If the threshold is decided by the STB manufacturer, the value of this threshold is fixed after the STB is manufactured.

(2) On the basis of rule (1), if multiple programs include the keyword and have the same start time, select one of the programs that have the same start time and put it into the playlist.

(3) Go on to generate the next playlist if the number of the BTV programs added to the first playlist is less than or equal to the number of the remaining BTV programs that meet conditions (namely, the remainder after the BTV programs in the first playlist are subtracted from all BTV program that meet conditions).

The process goes on, and a playlist of other virtual channels corresponding to this keyword is further created until the number of programs added to the playlist is greater than the number of programs not added to the playlist, whereupon creating a playlist of other virtual channels corresponding to this keyword stops.

According to the foregoing rules, in the generated playlist of virtual channels, it is possible that multiple BTV programs share the same time segment or that an idle time segment exists. An idle time segment is a period in which no BTV program of the playlist is played.

The generated playlist is stored in the memory of the STB, and is lost when the STB is powered off.

Besides, after the playlist is stored in the memory, the STB judges whether the first BTV program is finished. If the first BTV program is finished, the STB adds a new BTV program at the end of the playlist according to the previously selected keyword while deleting the first BTV program from the playlist.

Specifically, the objective of such processing is to prevent that no program is available for watching after the STB plays programs continuously for 24 hours because the initially generated playlist covers 24 hours only (or covers another period determined according to the set playlist duration rule, which shall not be construed as a limitation to the present disclosure). For that purpose, a new BTV program needs to be added. The new BTV program is scheduled at the end of the playlist to ensure continuity of the playlist.

Step S406: The STB activates a virtual channel.

Before being activated, the virtual channel is invisible to the user. Specifically, the user is unable to browse the virtual channel information in the EPG or access the virtual channel through channel switching.

After generating several (for example, 2) playlists of virtual channels according to the keyword (for example, "basketball live") selected by the user, the STB activates the virtual channel according to the number of generated playlists.

The details are as follows:

1. A virtual channel name is generated for the activated virtual channel.

The name of the virtual channel is one or more keywords. Multiple keywords are identified by numbers or letters, for example, basketball live 1, basketball live 2, basketball live A, and basketball live B.

2. The EPG can display virtual channel information to facilitate selection by the user.

3. The channel number of the activated virtual channel begins with the minimum channel number of the logical channel corresponding to the keyword, and increases sequentially (for example, 100, 101).

Step S407: The user accesses the virtual channel, and the STB plays the programs in the playlist corresponding to the virtual channel.

By pressing keys, the user accesses the virtual channel.

The key pressing operation may be performed through a remote control or control keys on the device. If the device provides or is connected to a touch control apparatus, the user may perform the operation through the touch control apparatus. The difference of the operation mode shall not be construed as a limitation to the present disclosure.

Based on the foregoing method for implementing virtual channels, the embodiment brings the following benefits:

(1) A complete connection solution is provided. The same type of BTV programs desired by the user are concatenated, thus reducing the key pressing operations of the user in the watching process.

(2) Keywords are offered to the user for selection. After the user activates a keyword according to the favorite program type, the STB selects the BTV programs of the same program type to generate a playlist of virtual channels, thus further reducing the operations when the user selects the favorite programs.

(3) After the user activates a keyword, the STB stores the keyword in a nonvolatile memory, and generates a playlist of virtual channels automatically at the next power-on. The STB provides the virtual channel service for the user automatically without requiring setting by the user.

(4) If the power is not interrupted, the STB judges whether the first BTV program in the playlist of virtual channels is finished according to the current time. If the first BTV program is finished, the STB adds a new BTV program at the end of the playlist according to the previously selected keyword to ensure that the virtual channel is played continuously.

Figure 5:
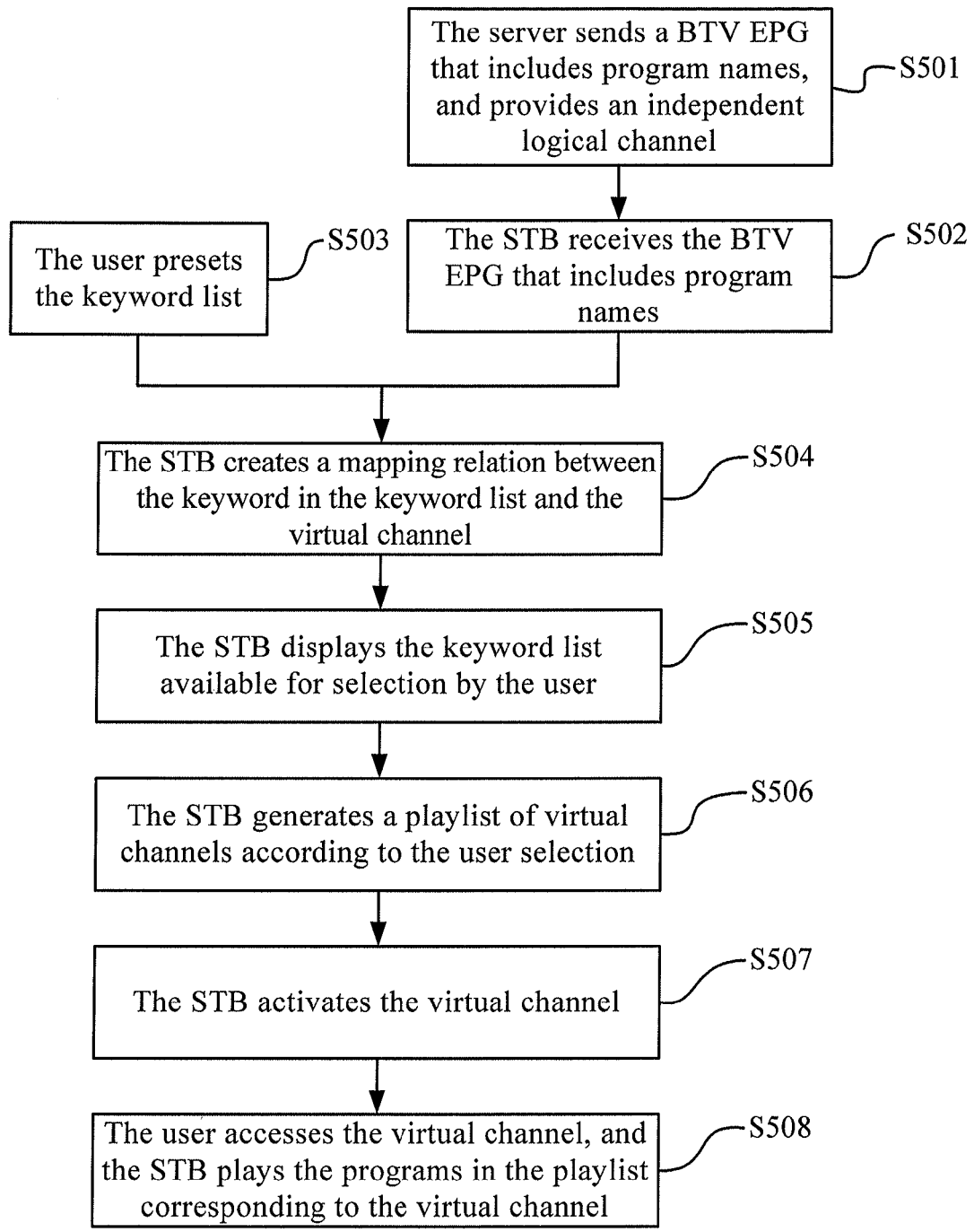
FIG. 5 is a flowchart of a method for playing programs in a fifth embodiment of the present disclosure.

FIG. 5 is a flowchart of a method for playing programs in the fifth embodiment of the present disclosure. In this embodiment, the user presets a keyword list, and the server sends a program inclusive of the program name. The method includes the following processes:

Step S501: The server sends a BTV EPG that includes program names, and provides an independent logical channel.

In this embodiment, the server is a front-end server.

The front-end server delivers a BTV EPG to each user, and provides a large-capacity independent logical channel for the virtual channel service. For example, the number segment of the channels is 100-599.

Step S502: The STB receives the BTV EPG that includes program names.

Step S503: The user presets a keyword list.

It should be noted that process S501, process S502, and process S503 are not sequence-sensitive. The sequence of such processes shall not be construed as a limitation to the present disclosure.

The keywords need to be stored in a nonvolatile memory of the STB. In subsequent processes, however, the activated keywords need to be differentiated.

The keywords are stored in a nonvolatile memory of the STB so that the user does not need to edit the keywords repeatedly. Repeated edit of the keywords leads to repeated erasure and shortens the lifecycle of the device.

Step S504: The STB creates a mapping relation between the keyword in the keyword list and the virtual channel.

After receiving the keyword list, the STB creates a mapping relation between each keyword and several independent logical channels. For example, the keyword "basketball live" corresponds to over 10 virtual channels, and the number segment of the channels is 100-109; the keyword "football live" corresponds to 10 virtual channels, and the number segment of the channels is 110-119.

Moreover, the STB creates a table of the mapping relations and stores it in a nonvolatile memory, as shown in Table 1 above.

Step S505: The STB displays a keyword list available for selection by the user.

In this process, the keyword list is displayed by an external display apparatus such as a television set, or by a display device of the STB, for example, a screen on the STB.

A virtual channel service submenu is set on the EPG page. Once the user selects this submenu, all keywords are displayed to the user for selection. In the displayed keywords, the active or inactive state of a keyword is indicated by a specific color or transparency.

Further, in this embodiment, the program keyword in the virtual channel service submenu can be enabled, disabled, and edited. The edit operations include:

Add: indicates whether to add a keyword to the keyword list; and

Modify/Delete: indicates whether to modify or delete a selected keyword.

With the foregoing edit options, the user can edit and maintain the keyword list more conveniently.

As regards adding a program keyword, the virtual channel service submenu displays not only all program keywords, but also an "add program keyword" submenu. The user can click this submenu to display an input box, in which the user can input the new program keyword.

As regards modifying and deleting a program keyword, after the user selects any program keyword and presses the OK key, a pull-down box appears beside the program keyword to provide three options: enable/disable, modify, and delete. If the user selects "modify", an input box appears, in which the user can input the modified program keyword; if the user selects "delete", the program keyword will be deleted.

In the case of adding a new program keyword, the STB creates a mapping relation between the program keyword and several independent channels automatically, as shown in Table 1; in the case of modifying a program keyword, the STB retains the existing mapping relation; in the case of deleting a program keyword, the STB cancels the mapping relation between the program keyword and several independent channels. All mapping relations need to be stored in a nonvolatile memory.

It should be noted that the keyword list is preset by the user, and may differ from the program name of the program. It is possible that no BTV program matches the program keyword selected by the user. In this case, the playlist generated by the STB is null, and the virtual channel cannot be activated.

Step S506: The STB generates a playlist of virtual channels according to the user selection.

After the user activates the keyword, the STB searches intraday (00:00:00 to 23:59:59) BTV EPGs of all channels according to the selected keyword to find all BTV programs whose new field content matches this keyword, and use the found BTV programs to form one or more playlists of virtual channels according to certain rules.

Besides, after the STB detects that the EPG is refreshed, the STB judges whether the BTV program information included in the playlist of virtual channels has changed; if so, the STB needs to regenerate the playlist of virtual channels; if not, the STB does not need to regenerate the playlist of virtual channels.

The playlist of virtual channels is made up according to the following rules:

(1) Arrange the programs preliminarily in the order of the start time of each program. Ensure that the ratio of the duration of the previous program to the total duration of the programs reaches a preset threshold before the next program is added, and ensure that the end time of the next program is later than the end time of the previous program.

The preset threshold is decided by the STB manufacturer or the user.

If the threshold is decided by the user, multiple options such as 100%, 90%, and 80% are offered on the setting page for selection by the user.

If the threshold is decided by the STB manufacturer, the value of this threshold is fixed after the STB is manufactured.

(2) On the basis of rule (1), if two programs have the same start time, select one of the programs randomly.

(3) Go on to generate the next playlist if the number of the BTV programs added to the first playlist is less than or equal to the number of the remaining BTV programs that meet conditions (namely, the remainder after the BTV programs in the first playlist are subtracted from all BTV program that meet conditions).

According to the foregoing rules, in the generated playlist of virtual channels, it is possible that multiple BTV programs share the same time segment or that an idle time segment exists. An idle time segment is a period in which no BTV program of the playlist is played.

The generated playlist is stored in the memory of the STB, and is lost when the STB is powered off.

Besides, after the playlist is stored in the memory, the STB judges whether the first BTV program is finished. If the first BTV program is finished, the STB adds a new BTV program at the end of the playlist according to the previously selected keyword while deleting the first BTV program from the playlist.

Specifically, the objective of adding a new BTV program is to prevent that no program is available for watching after the STB plays programs continuously for 24 hours because the initially generated playlist covers 24 hours only (or covers another period determined according to the set playlist duration rule, which shall not be construed as a limitation to the present disclosure). For that purpose, a new BTV program needs to be added. The new BTV program is scheduled at the end of the playlist to ensure continuity of the playlist.

Step S507: The STB activates the virtual channel.

Before being activated, the virtual channel is invisible to the user. Specifically, the user is unable to browse the virtual channel information in the EPG or access the virtual channel through channel switching.

After generating several (for example, 2) playlists of virtual channels according to the keyword (for example, "basketball live") selected by the user, the STB activates the virtual channel according to the number of generated playlists.

The details are as follows:

1. The name of the virtual channel is one or more keywords. Multiple keywords are identified by numbers or letters, for example, basketball live 1, basketball live 2, basketball live A, and basketball live B.

2. The EPG can display virtual channel information.

3. The channel number of the activated virtual channel begins with the minimum channel number of the logical channel corresponding to the keyword, and increases sequentially (for example, 100, 101).

Step S508: The user accesses the virtual channel, and the STB plays the programs in the playlist corresponding to the virtual channel.

By pressing keys, the user accesses the virtual channel.

The key pressing operation may be performed through a remote control or control keys on the device. If the device provides or is connected to a touch control apparatus, the user may perform the operation through the touch control apparatus. The difference of the operation mode shall not be construed as a limitation to the present disclosure.

Based on the foregoing method for implementing virtual channels, the embodiment brings the following benefits:

(1) A complete connection solution is provided. The same type of BTV programs desired by the user are concatenated, thus reducing the key pressing operations of the user in the watching process.

(2) Keywords are offered to the user for selection. After the user activates the keyword according to the favorite program type, the STB selects the BTV programs of the same program type to generate a playlist of virtual channels, thus further reducing the operations when the user selects the favorite programs.

(3) After the user activates a keyword, the STB stores the keyword in a nonvolatile memory, and generates a playlist of virtual channels automatically at the next power-on. The STB provides the virtual channel service for the user automatically without requiring setting by the user.

(4) If the power is not interrupted, the STB judges whether the first BTV program in the playlist of virtual channels is finished according to the current time. If the first BTV program is finished, the STB adds a new BTV program at the end of the playlist according to the previously selected keyword to ensure that the virtual channel is played continuously.

It should be noted that other solutions derived from the third embodiment and the fourth embodiment above are also covered in the scope of the present disclosure.

Further, in the method for playing programs in the third embodiment and the fourth embodiment above, after the user accesses the virtual channel and the STB plays the programs in the playlist corresponding to the virtual channel, the procedure may include switching between multiple virtual channels and switching between the virtual channel service and the basic service, which will be described in the following embodiments.

Figure 6:
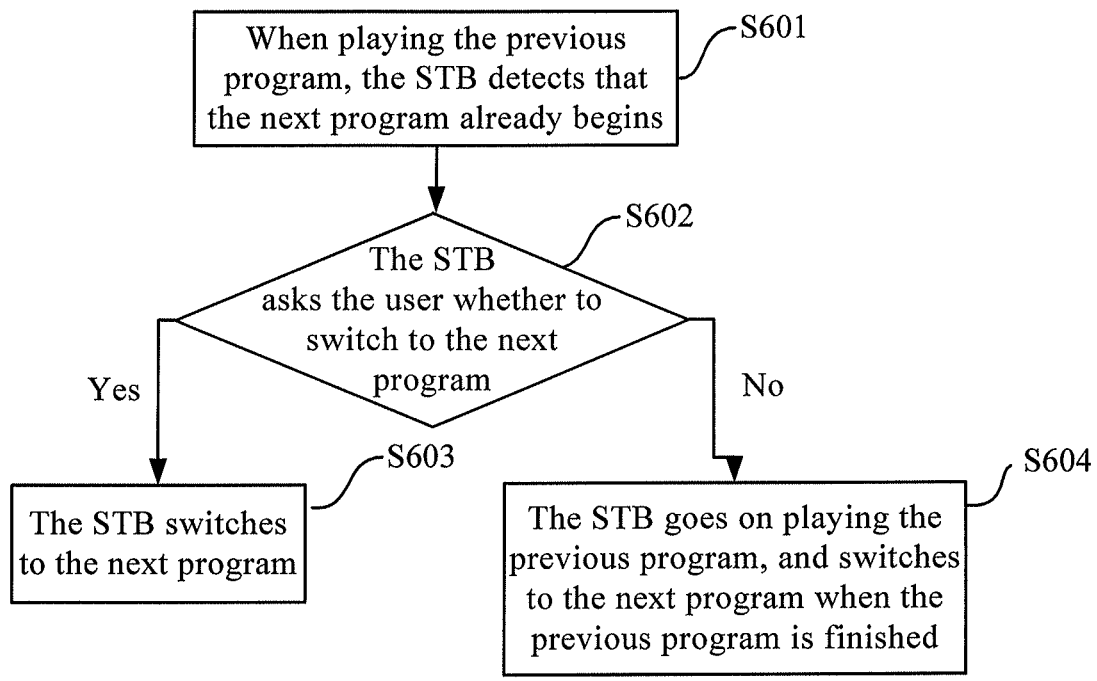
FIG. 6 shows a program switching procedure in a virtual channel playing process in a sixth embodiment of the present disclosure.

FIG. 6 shows a program switching procedure in a virtual channel playing process in the sixth embodiment of the present disclosure.

After the user selects the virtual channel, because the playlist of the virtual channel aggregates the BTV programs of different channels according to certain rules, multiple BTV programs may share one time segment, or an idle time segment may exist.

If multiple BTV programs share one time segment, the program switching procedure in the virtual channel playing process includes the following processes:

Step S601: When playing the previous program, the STB detects that the next program already begins.

Step S602: The STB asks the user whether to switch to the next program.

If the user agrees to switch to the next program, process S603 occurs.

If the user refuses to switch to the next program, process S604 occurs.

Step S603: The STB switches to the next program.

Step S604: The STB goes on playing the previous program, and switches to the next program when the previous program is finished.

If an idle time segment exists, the program switching procedure in the virtual channel playing procedure is: The STB carries out different services in the idle time segment according to certain policies, for example, playing advertisements or preset music or movies.

Through this embodiment, the user can switch between programs in playing programs in the virtual channels, no interruption or lack of programs occurs in the idle time segment, and the user experience is improved.

Figure 7:
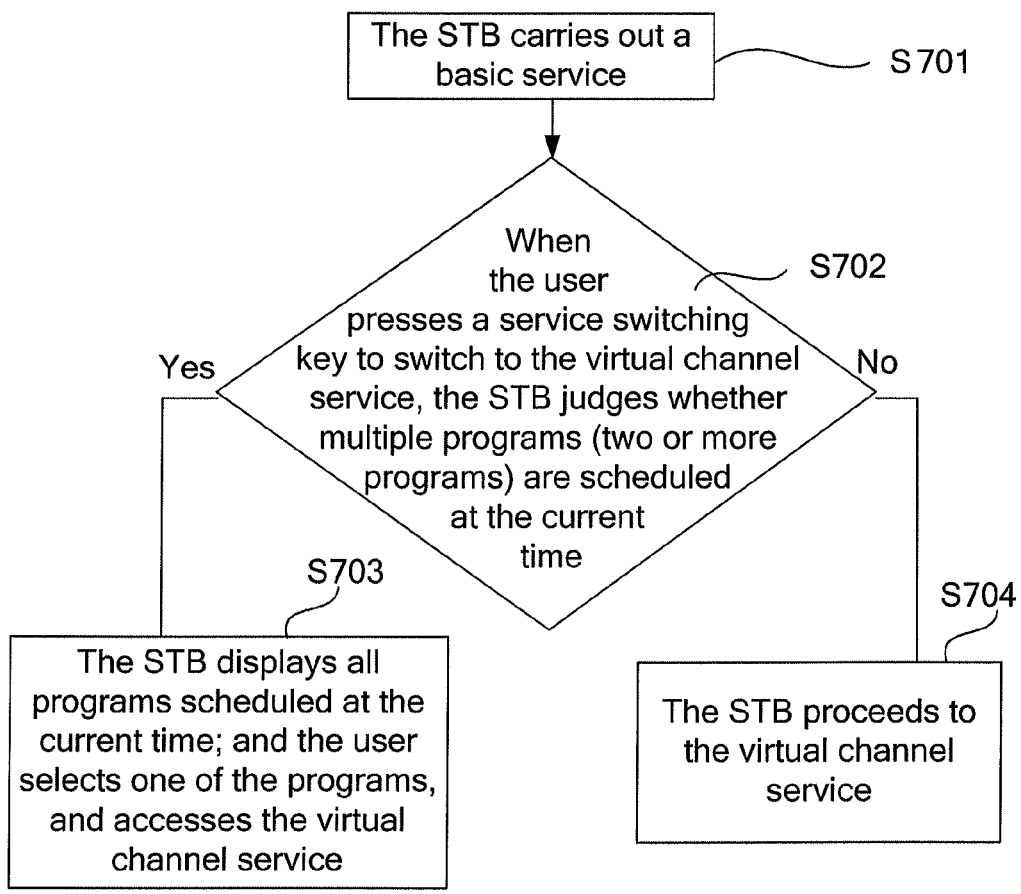
FIG. 7 shows a procedure for switching between a virtual channel service and a basic service in a seventh embodiment of the present disclosure.

FIG. 7 shows a procedure for switching between a virtual channel service and a basic service in the seventh embodiment of the present disclosure.

This embodiment defines the virtual channel playing as a virtual channel service, and defines other services of the STB as basic services.

The switching between the virtual channel service and the basic service includes the following processes:

Step S701: The STB carries out a basic service.

Step S702: When the user presses a service switching key to switch to the virtual channel service, the STB judges whether multiple programs (two or more programs) are scheduled at the current time.

If so, process S703 occurs; or if not, process S704 occurs.

Step S703: The STB displays all programs scheduled at the current time. The user selects one of the programs, and accesses the virtual channel service.

Step S704: The STB proceeds to the virtual channel service.

Besides, the switching from the virtual channel service to the basic service is the same as the switching from an ordinary BTV service to the basic service.

Further, the switching between multiple virtual channels is described below:

A virtual channel is actually a special BTV channel.

According to the definition of the basic service above, the BTV channel service is a basic service.

Therefore, the switching between different virtual channel services is basically the same as the switching from a virtual channel service to a basic service.

Through this embodiment, the user can switch between a virtual channel service and a basic service, and switch between different virtual channels flexibly, and enjoy a better experience.

After reading the foregoing embodiments, those skilled in the art are clearly aware that the present disclosure may be implemented through hardware, or through software in addition to a necessary universal hardware platform. The present disclosure may be embodied in a software product. The software product may be stored in a nonvolatile storage medium (such as a CD-ROM, a USB flash disk, or a mobile hard disk), and may incorporate several instructions that enable a computer device (such as a personal computer, a server, or a network device) to perform the methods provided in any embodiment of the present disclosure.

It is understandable to those skilled in the art that the accompanying drawings are only schematic diagrams of the preferred embodiments, and the modules or processes in the accompanying drawings are not mandatory for implementing the present disclosure.

The above descriptions are merely preferred embodiments of the present disclosure, and persons having ordinary skill in the art may make various improvements and refinements without departing from the spirit of the disclosure. All such modifications and refinements shall be deemed to fall within the scope of the present disclosure.

What is claimed is:

1. A method for playing programs, comprising:
   creating, in a terminal, virtual channels corresponding to keywords in a keyword list, and using the virtual channels to form a virtual channel list;
   identifying programs inclusive of the keywords of the keyword list among received programs;
   generating a playlist of the virtual channels corresponding to the keywords by using the identified programs and a preset playlist generation rule; and
   playing the programs in the playlist on the terminal, wherein the preset playlist generation rule comprising:
      arranging the programs in order of start time of the programs,
      determining whether a ratio of a duration of each program to a total duration of the programs in the playlist being greater than a preset threshold before adding a next program to the playlist; and wherein an end time of the next program is later than the end time of a previous program in the playlist.

2. The method according to claim 1, wherein:
   creating the virtual channels corresponding to the keywords in the keyword list, and using the virtual channels to form the virtual channel list comprises:
   mapping the keywords in the keyword list to one or more virtual channels in the virtual channel list, and mapping each virtual channel to an independent logical channel, wherein a virtual channel number of the virtual channel is the same as a logical channel number of the logical channel.

3. The method according to claim 1, wherein the keyword list is obtained in at least one of the following ways:
   the keyword list is received from a server; and
   the keyword list is preset by a user.

4. The method according to claim 3, wherein after generating the playlist of the virtual channels corresponding to the keywords, the method further comprises:
   detecting whether any keyword in the keyword list has been changed;
   if any keyword in the keyword list has been changed, updating the virtual channel list according to the changed keyword list.

5. The method according to claim 4, wherein detecting whether any keyword in the keyword list has been changed comprises one of the following:
   if the keyword list is received from the server, detecting addition or deletion of the keyword in the keyword list; and
   if the keyword list is preset by the user, detecting addition, modification or deletion of the keyword in the keyword list.

6. The method according to claim 1, wherein identifying the programs inclusive of the keywords among the received programs is:
   when the keywords in the keyword list are activated, identifying programs inclusive of activated keywords among the received programs;

wherein the activation of the keywords in the keyword list comprises:
displaying the keywords in the keyword list and current states of the keywords; and
receiving a message for activating or deactivating one or more keywords in the keyword list.

7. The method according to claim 6, wherein the displaying of the keywords in the keyword list and the current states of the keywords comprises:
displaying the keywords in the keyword list; and using different colors, transparencies, fonts, or sizes of words to indicate whether the current states of the corresponding keywords are active or inactive.

8. The method according to claim 6, wherein the activation of the keywords in the keyword list comprises:
receiving a message for selecting one or more keywords in the keyword list; and
if the current state of one or more keywords in the keyword list indicated in the message for selecting keywords is "active," prompting the user to decide whether to deactivate the keywords; or
if the current state of one or more keywords in the keyword list indicated in the message for selecting keywords is "inactive," prompting the user to decide whether to activate the keywords.

9. The method according to claim 8, wherein:
receiving the message for selecting one or more keywords in the keyword list if the keyword list is preset by the user comprises:
prompting the user to decide whether to add a keyword to the keyword list; and
prompting the user to decide whether to modify or delete a selected keyword.

10. The method according to claim 1, wherein the received programs comprises at least one of the following:
programs that comprise a keyword field, wherein the programs are sent by a server and the keyword field is preset by the server; and
programs that comprise a program name, wherein the programs are sent by the server.

11. The method according to claim 1, wherein after playing the programs in the playlist, the method further comprises:
if multiple virtual channels are activated, switching between the activated virtual channels according to a received virtual channel switching message.

12. The method according to claim 1, wherein: before playing the programs in the playlist, the method further comprises activation of the virtual channels, and the activation comprises:
activating one or more virtual channels that correspond to the keywords and comprise the playlist, wherein a logical channel number of a logical channel corresponding to the virtual channel is a minimum logical channel number corresponding to the keywords; if multiple virtual channels are activated, the logical channel number corresponding to the virtual channels increases sequentially;
generating virtual channel names for the activated virtual channels; and
displaying information about the activated virtual channels.

13. A method for playing programs, comprising:
retrieving keywords of each program according to a program type, and generating a keyword list according to the keywords;
retrieving the keywords in the keyword list to generate an Electronic Program Guide (EPG) of the programs, and adding a corresponding keyword to each program in the EPG according to the retrieved keywords; and
sending the keyword list and the EPG to a terminal so that the terminal can select the programs that match the keywords according to the keyword list and the EPG, generate a playlist of corresponding virtual channels, and play the programs in the playlist, wherein the terminal generates the playlist of corresponding virtual channels by using the selected programs and a preset playlist generation rule, wherein the preset playlist generation rule comprising:
arranging the programs in order of start time of the programs;
determining whether a ratio of a duration of each program to a total duration of the programs in the playlist being greater than a preset threshold before adding a next program to the playlist; and wherein an end time of the next program is later than the end time of a previous program in the playlist.

14. The method according to claim 13, further comprising:
generating a new keyword list according to changes of the programs; and
sending a message for updating the keyword list to the terminal according to the new keyword list, or sending the updated keyword list to the terminal.

15. A terminal for playing programs, comprising:
a channel list creating module, configured to create virtual channels corresponding to keywords in a keyword list according to the keywords, and use the virtual channels to form a virtual channel list;
an identifying module, configured to identify programs inclusive of the keywords among received programs according to activated keywords when the keywords in the keyword list are activated;
a playlist generating module, configured to generate a playlist of the virtual channels corresponding to the keywords using the identified programs by the identifying module and a preset playlist generation rule, wherein the preset playlist generation rule causes the playlist generating module to:
arrange the programs in order of start time of the programs;
determine a ratio of a duration of each program to a total duration of the programs in the playlist being greater than a preset threshold before adding a next program to the playlist; and wherein an end time of the next program is later than the end time of a previous program in the playlist; and
an activating module, configured to activate the virtual channels, and play the programs in the playlist generated by the playlist generating module.

16. The terminal according to claim 15, further comprising:
a keyword list obtaining module, configured to obtain the keyword list and provide the keyword list for the channel list creating module;
wherein:
the keyword list obtaining module comprises at least one of the following:
a keyword list receiving submodule, configured to receive the keyword list sent by a server; and
a keyword list editing submodule, configured to receive an operation message from a user and edit the keyword list.

17. The terminal according to claim 15, wherein the identifying module comprises:
- a keyword matching submodule, configured to match the activated keywords with information in a keyword field if the programs comprise the keyword field, and identify the programs inclusive of the activated keywords; and
- a program name matching submodule, configured to match the activated keywords with information in program names of the programs if the programs comprise no keyword field, and identify the programs inclusive of the activated keywords.

18. The terminal according to claim 15, wherein the channel list creating module comprises:
- a keyword list detecting submodule, configured to detect whether any keyword in the keyword list has been changed; and
- a keyword list updating submodule, configured to update the virtual channel list according to the changed keyword list if the keyword list detecting submodule detects that the keyword in the keyword list has been changed.

19. The terminal according to claim 15, further comprising:
- a channel list storing module, configured to store the virtual channel list created by the channel list creating module;
- a controlling module, configured to operate the virtual channels in the virtual channel list created by the channel list creating module, or the playlist generated by the playlist generating module.

20. A system for playing programs, comprising:
- a server, configured to deliver programs to a terminal, and send an Electronic Program Guide (EPG); and
- the terminal, configured to identify programs inclusive of activated keywords among the programs delivered by the server, generate a playlist of virtual channels corresponding to the keywords, and play the programs in the playlist corresponding to the virtual channels after the virtual channels are activated, wherein the terminal generates the playlist of virtual channels corresponding to the keywords by using the identified programs and a preset playlist generation rule, wherein the preset playlist generation rule causes to the terminal to:
- arrange the programs in order of start time of the programs;
- determine whether a ration of a duration of each program to a total duration of the programs in the playlist is greater than a preset threshold before adding a next program to the playlist; and wherein an end time of the next program is later than the end time of a previous program in the playlist.

21. The system according to claim 20, comprising at least one of the following:
- the server configured to retrieve keywords of the programs and generate a keyword list; and
- the terminal configured to receive an operation message from a user and edit the keyword list.

* * * * *

UNITED STATES PATENT AND TRADEMARK OFFICE
CERTIFICATE OF CORRECTION

PATENT NO.         : 8,464,294 B2
APPLICATION NO.    : 13/052915
DATED              : June 11, 2013
INVENTOR(S)        : Dawei Yu et al.

Page 1 of 1

It is certified that error appears in the above-identified patent and that said Letters Patent is hereby corrected as shown below:

In the Claims

In column 22, claim 20, line 15, after "determine whether a" replace "ration" with --ratio--.

Signed and Sealed this
Thirteenth Day of August, 2013

Teresa Stanek Rea
*Acting Director of the United States Patent and Trademark Office*